United States Patent
Galera et al.

(10) Patent No.: US 7,522,066 B2
(45) Date of Patent: Apr. 21, 2009

(54) SYSTEMS AND METHODS THAT EVALUATE DISTANCE TO POTENTIAL HAZARDS UTILIZING OVERLAPPING SENSING ZONES

(75) Inventors: Richard Galera, Nashua, NH (US); James E. Dogul, Hudson, NH (US); George E. Rollins, Chelmsford, MA (US); Derek W. Jones, Dumfries Galloway (GB); George K. Schuster, Royal Oak, MI (US); Suresh R. Nair, Amherst, NH (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 434 days.

(21) Appl. No.: 11/360,730

(22) Filed: Feb. 23, 2006

(65) Prior Publication Data
US 2007/0194944 A1 Aug. 23, 2007

(51) Int. Cl.
*G08B 21/00* (2006.01)

(52) U.S. Cl. ............ 340/686.6; 340/686.5; 340/539.13; 340/825.49

(58) Field of Classification Search ............... 340/686.6, 340/686.5, 539.13, 825.49, 988, 825.72, 340/5.7; 280/735
See application file for complete search history.

(56) References Cited

U.S. PATENT DOCUMENTS

| | | | |
|---|---|---|---|
| 5,835,008 A * | 11/1998 | Colemere, Jr. | .............. 340/439 |
| 6,084,510 A | 7/2000 | Lemelson et al. | |
| 6,469,619 B1 | 10/2002 | Maycheck et al. | |
| 6,608,559 B1 | 8/2003 | Lemelson et al. | |
| 6,829,371 B1 | 12/2004 | Nichani et al. | |
| 6,847,892 B2 | 1/2005 | Zhou et al. | |
| 6,876,308 B1 | 4/2005 | Ghahramani | |
| 6,917,300 B2 * | 7/2005 | Allen | ...................... 340/686.6 |
| RE38,870 E | 11/2005 | Hall | |
| 6,997,090 B2 | 2/2006 | Gass et al. | |
| 7,042,344 B2 * | 5/2006 | Chiba et al. | .................. 340/435 |
| 2003/0151541 A1 | 8/2003 | Oswald et al. | |
| 2003/0154932 A1 | 8/2003 | Schell et al. | |
| 2004/0119633 A1 | 6/2004 | Oswald et al. | |
| 2004/0148039 A1 | 7/2004 | Farchmin et al. | |
| 2005/0046584 A1 | 3/2005 | Breed | |
| 2005/0141681 A1 | 6/2005 | Graiger | |
| 2005/0275513 A1 | 12/2005 | Grisham et al. | |

OTHER PUBLICATIONS

International Search Report dated Nov. 1, 2007 for PCT Application Serial No. PCT/US07/62743, 2 Pages.

* cited by examiner

*Primary Examiner*—Anh V La
(74) *Attorney, Agent, or Firm*—Amin Turocy & Calvin LLP; William R. Walbrun

(57) ABSTRACT

The claimed subject matter provides industrial automation systems and/or methods that evaluate a proximity to potential hazards. A plurality of sensors can provide redundant detected data. Additionally, a proximity evaluation component can evaluate the detected data, determine a location of at least one of a person and an object, and identify a distance from the location to one or more hazardous zones in a monitored region.

38 Claims, 12 Drawing Sheets

SYSTEMS AND METHODS THAT EVALUATE DISTANCE TO POTENTIAL HAZARDS UTILIZING OVERLAPPING SENSING ZONES

TECHNICAL FIELD

The claimed subject matter relates to industrial control systems and, more particularly, to evaluating a distance to potential hazards by employing overlapping sensing zones.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

Industrial controllers can be employed to effectuate completion of most industrial processes. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involve assembly of previously processed materials. Oftentimes, such as in the case of automobiles, complex assemblies can be manufactured with high technology robotics assisting the industrial control process.

Industrial automation environments commonly utilize redundancy to provide availability and/or safety. For instance, two or more industrial automation devices (e.g., sensors, logic solvers, . . . ) can be employed in connection with a particular machine, process, product, environment, etc., and disparate outputs from the devices can be combined. Each of the industrial automation devices can provide an output (e.g., vote), and the outputs can be combined to effectuate an action, to yield a measured condition, to continue and/or halt operation of the machine, process, etc. However, conventional architectures commonly provide fixed voting relationships between the industrial automation devices.

Moreover, conventional techniques employing redundancy typically fail to provide safety by way of identifying potentially hazardous zones and/or distances thereto. Rather, to maintain a safe environment, safety margins that can be larger than necessary are commonly employed. Pursuant to an illustration, a safety margin associated with a machine may be predefined to provide stopping the machine whenever a user enters into a restricted area. However, for instance, such an environment may not be optimized for presence of a person in a dangerous area and/or may fail to adapt to the presence of a person. Accordingly, downtime associated with processes, machines, etc. can be yielded by conventional techniques due to unnecessary shutdowns.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to systems and/or methods that facilitate evaluating a proximity to potential hazards in an industrial automation environment. A monitored region can utilize any number of sensing devices (e.g., sensors) that can employ similar and/or disparate types of sensing technologies (e.g., Doppler, Global Positioning System (GPS), vision, . . . ). The sensing devices can provide overlapping sensing zones that can enable evaluating a distance between a person and/or an object and a potential hazard. For instance, potential dangerous zones during operation (e.g., of a machine, process, . . . ) can be identified. Further, a position of the person and/or object can be determined. Moreover, a distance between the position of the person and/or object and dangerous zone(s) can be calculated. Accordingly, a sense (e.g., continuous, intermittent, . . . ) of the person and/or object can be obtained and proximity to hazards can be determined; thus, operations associated with a machine, process, etc. can be modified to accommodate the presence of the person and/or the object while enhancing safety associated with the environment.

In accordance with various aspects of the claimed subject matter, a proximity evaluation component can determine a location of a person and/or an object, and identify a distance from the location to hazardous zones. A hazardous zone recognition component can identify hazardous zones within a monitored region. It is to be appreciated that the hazardous zones can be associated with any potential dangers in an industrial automation environment. By way of example and not limitation, the hazards can be related to movement of machinery, temperature, pressure, emitted radiation, etc. The hazardous zones can be defined (e.g., utilizing the hazardous zone recognition component and/or a teaching component, . . . ) prior to entry into the environment by a person, an object, etc. Additionally or alternatively, the hazardous zones can be updated (e.g., employing the hazardous zone recognition component and/or a definition component, . . . ) as detected data can be collected with the sensors, for example. Moreover, warning zone(s) and/or safety zone(s) can be provided around the hazardous zones. By way of illustration, the warning zones can indicate a threshold distance inside of which an alarm can be provided and the safety zones can present a disparate threshold distance associated with modifying operations (e.g., related to a process, machine, . . . ).

Pursuant to one or more aspects of the claimed subject matter, the proximity evaluation component and/or a location component can identify a location of a person and/or an object in a monitored region. Further, the proximity evaluation component and/or a distance analysis component can determine a closest hazardous zone and/or a minimum distance from the location of the person and/or the object to the hazardous zones. The distance related information can be provided to a safety logic component that can provide an appropriate response. For instance, the safety logic component can aggregate the distance related information obtained via a plurality of sensors, and thereafter analyze the aggregated data. Moreover, weights associated with confidences of accurate measurement related to each of the sensors can be utilized in connection with assembling the distance related information. Additionally or alternatively, the safety logic component can separately evaluate the distance related information from the plurality of sensors.

To the accomplishment of the foregoing and related ends, certain illustrative aspects of the claimed subject matter are described herein in connection with the following description and the annexed drawings. These aspects are indicative, however, of but a few of the various ways in which the principles of such matter can be employed and the claimed subject matter is intended to include all such aspects and their equivalents. Other advantages and novel features will become apparent from the following detailed description when considered in conjunction with the drawings.

DETAILED DESCRIPTION

Figure 1:
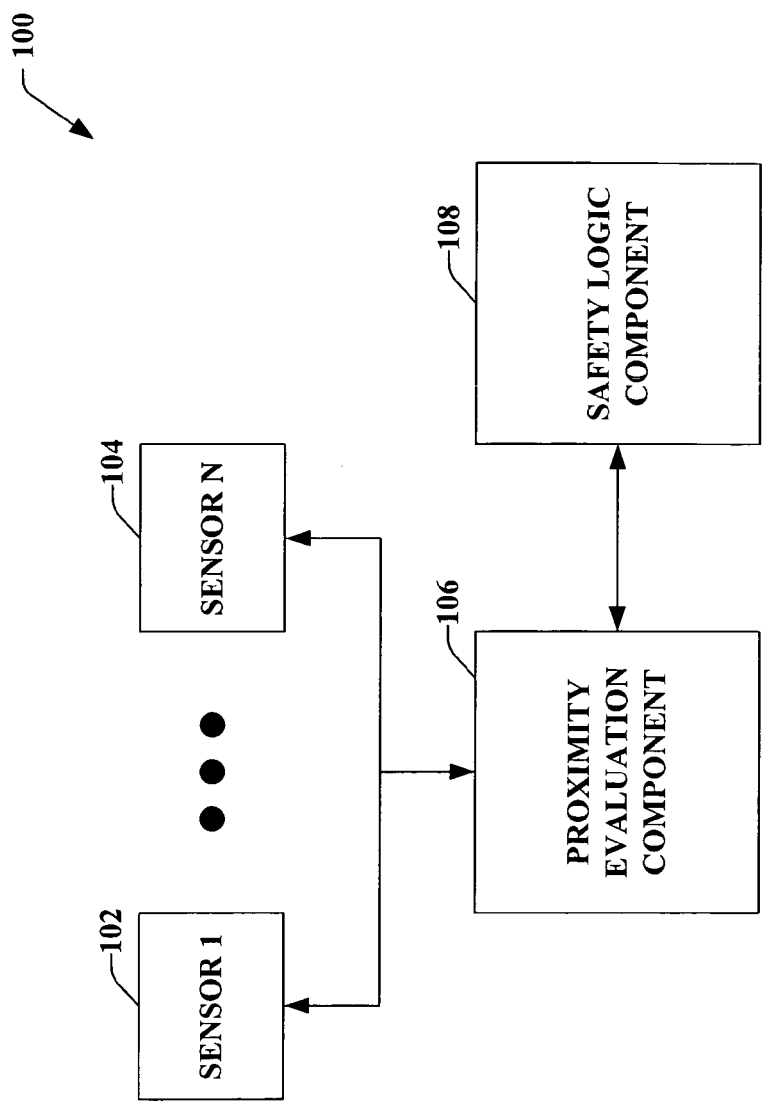
FIG. 1 illustrates a block diagram of an exemplary system that enables evaluating distance(s) to potential hazard(s) in an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the subject innovation.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that enables evaluating distance(s) to potential hazard(s) in an industrial automation environment. The system 100 can include any number of sensors 102-104 (e.g., sensor 1 102, . . . sensor N 104, where N can be any positive integer). It is to be appreciated that the sensors 102-104 can be utilized to monitor and/or detect any type of signal and/or physical condition associated with a machine, a person, a process, a product, an environment, etc. The sensors 102-104 can provide the detected data to a proximity evaluation component 106 that can determine a distance to a potential hazard. Thus, by way of illustration, the proximity evaluation component 106 can utilize the detected data from the sensors 102-104 to identify a location at which a person and/or an object can enter into and/or traverse within and/or exit a monitored region. Additionally or alternatively, the proximity evaluation component 106 can determine and/or obtain information (e.g., location related information, . . . ) associated with dangerous zone(s) during operation of a machine, a process, etc. within the region monitored via the sensors 102-104. Moreover, the proximity evaluation component 106 can calculate a distance (e.g., minimum distance, . . . ) between the person and/or the object and any number of dangerous zones. Further, the system 100 can include a safety logic component 108 that can utilize data associated with distance(s) to potential hazard(s) to effectuate modifying operation associated with a machine, process, etc. It is to be appreciated that the data associated with distance(s) to potential hazard(s) can be provided to a disparate component (not shown) to enable further utilization of such information; however, the claimed subject matter is not so limited.

The multiple sensors 102-104 can be utilized to monitor and/or record a two-dimensional image of an environment facing each of the sensors 102-104, for example. The sensors 102-104 can continuously monitor the environment, intermittently evaluate the environment at predetermined and/or varying intervals of time, monitor the environment upon an occurrence of an event (e.g., starting operation, modifying operation, determining a person and/or object entered the monitored region, . . . ), etc. Additionally, the sensors 102-104 can provide redundancy by way of utilizing overlapping sensing ranges associated with each of the sensors 102-104. Thus, for example, any number of the sensors 102-104 can redundantly detect data related to a particular machine, person, object, process, product, environment, etc. The overlap can create redundancy within a sensor system that can be utilized in connection with a control system such as, for instance, a safety system, an availability system, a system that can customize (e.g., optimize) allocation of redundancy (e.g., dynamically during runtime, at a time of setup, . . . ) to provide for a mixture of safety and availability, etc. Pursuant to an example, a person can be traversing through an industrial automation environment (e.g., region monitored with the sensors 102-104, . . . ) and her location can be continuously monitored by any number of disparate sensors (e.g., two, three, . . . N, where N can be any positive integer). Thus, an overlapping view of the location of the person can be obtained; however, the claimed subject matter is not limited to the aforementioned example.

By way of another example, the sensors 102-104 can be positioned to enable monitoring areas within an industrial automation environment in which a person and/or object can traverse. It is to be appreciated that the monitored areas can be any size, any shape, contain any machinery, and/or be associated with any characteristics. Pursuant to an illustration, free space between hazardous areas can be monitored with the sensors 102-104. According to this illustration, it is contemplated that each of the sensors 102-104 can monitor the entire free space region, a portion of the free space region, etc. Additionally, it is contemplated that each of the sensors 102-104 can be positioned at any location, angle, etc. with respect to the monitored region and/or in comparison to the other sensors 102-104. Moreover, any geographic overlap, detection resolution(s), sensing range(s), etc. can be associated with the sensors 102-104.

One skilled in the art can recognize that any type of sensor(s) can be utilized in connection with the claimed subject matter. For instance, the sensors 102-104 can be thermal energy sensors, electromagnetic sensors, mechanical sensors, chemical sensors, optical sensors, radiation sensors, acoustic sensors, biological sensors, etc. Pursuant to an illustration, the sensors 102-104 can utilize similar and/or different sensing technologies (e.g., Doppler, global positioning system (GPS), vision, . . . ). Additionally or alternatively, the sensors 102-104 can be employed to measure and/or analyze any type of signal, physical condition, chemical compound, etc. that can be associated with any machine, process, person, product, environment, etc. By way of example, the sensors 102-104 can detect whether a machine is operational, identify a dangerous area associated with a machine and/or process, and monitor a location of a worker; however, the subject claims are not so limited.

As indicated above, the proximity evaluation component 106 can determine a location of a person and/or object in relation to potentially dangerous zones during operation of a machine, a process, etc. based upon an analysis of detected data obtained via the overlapping sensors 102-104. For instance, the proximity evaluation component 106 can determine distance(s) from potential hazard(s) by individually analyzing the detected data provided from each of the sensors 102-104; thereafter, the separately determined distances associated with each of the sensors 102-104 can be combined, for instance, with the proximity evaluation component 106, the safety logic component 108, a disparate component (not shown), a combination thereof, etc. Pursuant to a further illustration, the detected data from the sensors 102-104 can be combined and thereafter analyzed via the proximity evaluation component 106 to identify distance(s) from potential hazard(s). It is to be appreciated that the claimed subject matter is not limited to the aforementioned examples.

The safety logic component 108 can be coupled to the proximity evaluation component 106 and can utilize the distance data generated with the proximity evaluation component 106 to yield an appropriate response. By way of example, the safety logic component 108 can enable modifying, halting, slowing, speeding up, continuing, restarting, etc. operation associated with a machine, a process, etc. Further, the safety logic component 108 can facilitate providing an alarm in connection with the distance related information. Moreover, the safety logic component 108 can combine distance related information associated with any number of disparate sensors 102-104, and thereafter provide an appropriate response. It is to be appreciated that the safety logic component 108 can effectuate such combination utilizing a voting configuration that provides a high level of safety, a high level of availability, a combination thereof, etc. Accordingly, the voting configuration can provide a manner in which the information from the proximity evaluation component 106 can be aggregated and/or analyzed. Although depicted as being separate components, it is to be appreciated that the proximity evaluation component 106 and the safety logic component 108 can be a single component, the proximity evaluation component 106 can comprise at least a portion of the safety logic component 108, and/or the safety logic component 108 can include at least a portion of the proximity evaluation component 106.

The proximity evaluation component 106 and/or the safety logic component 108 can provide for enhanced safety by enabling effectuation of a continuous evaluation as to a location and/or change in location of a person, object, etc. in relation to hazard(s) positioned within an industrial automation environment. In comparison to conventional techniques that commonly utilize larger than necessary safety margins due to a lack of an ability to locate a person and/or an object within a dangerous area, the proximity evaluation component 106 and/or the safety logic component 108 can yield identified distances to potential hazard(s). According to a further example, the proximity evaluation component 106 and/or the safety logic component 108 can enable adapting a process, operation of a machine, etc. based upon presence and location relative to a hazard of a person, object, etc. to enhance safety of an environment. Thus, for instance, upon the proximity component 106 determining that a person is located at a distance from a hazard that can be smaller than a threshold value, the safety logic component 108 can halt and/or modify operation of a machine, process, etc.; however, the claimed subject matter is not so limited.

Figure 2:
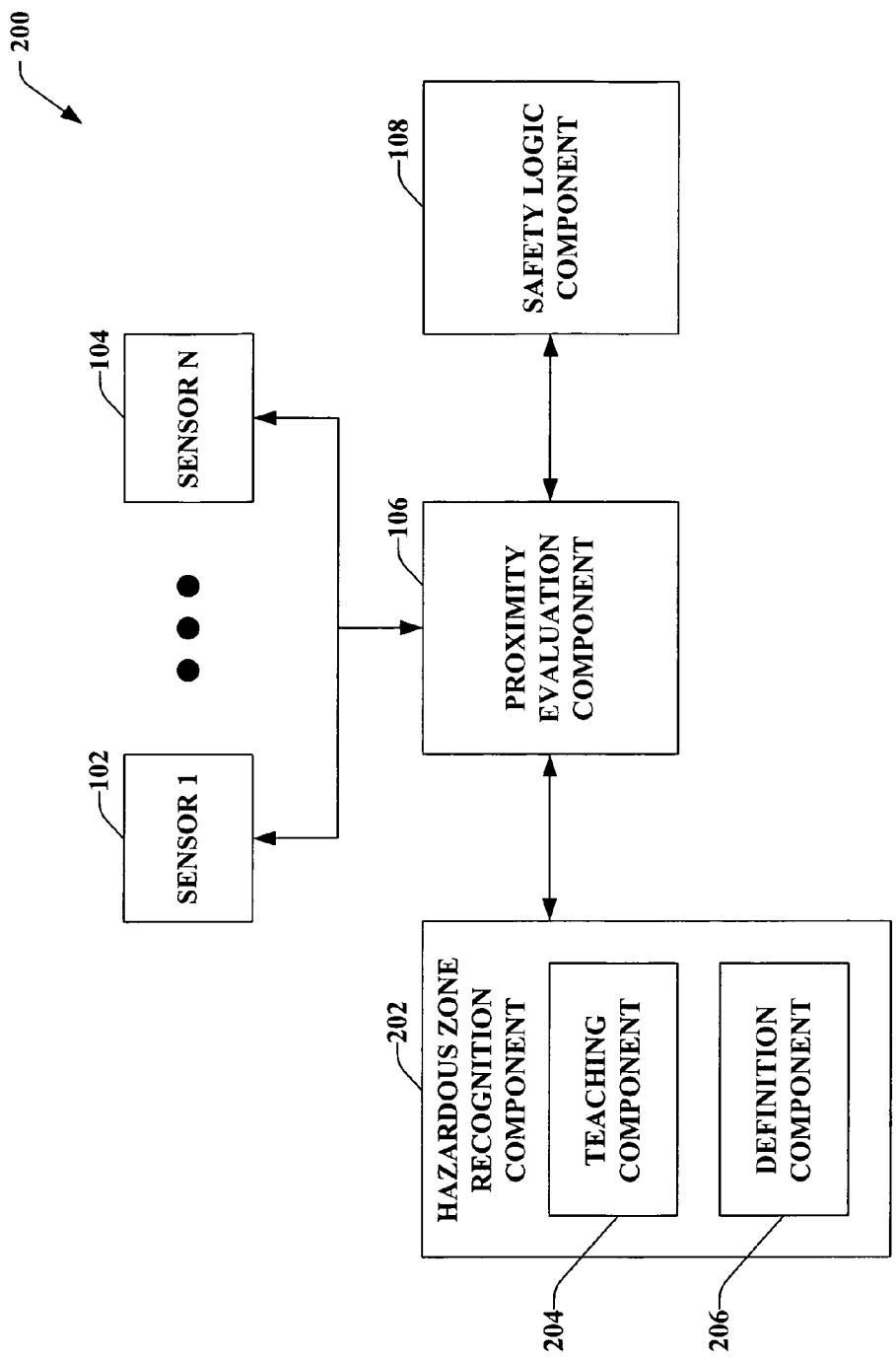
FIG. 2 illustrates a block diagram of an exemplary system that identifies hazardous zones within an industrial automation environment.

Turning to FIG. 2, illustrated is a system 200 that identifies hazardous zones within an industrial automation environment. The system 200 can include any number of sensors 102-104 that can monitor any type of signal, physical condition, etc. and provide detected data to the proximity evaluation component 106. The proximity evaluation component 106 can determine a position (e.g., in real time, at any disparate time, . . . ) of a person, an object, a hazard, a distance from a hazard, etc. Further, the safety logic component 108 can effectuate modifying a process and/or utilization of a machine based upon the location related data.

The system 200 can additionally include a hazardous zone recognition component 202 that can identify hazardous zones within an industrial automation environment. Any number of hazardous zones can be located by the hazardous zone recognition component 202. Further, each of the hazardous zones can be any shape, size, etc. and/or can be associated with any machine, process, etc. Moreover, the hazardous zones can remain static at all times, change over time, etc. According to an illustration, the hazardous zone recognition component 202 can determine that a potential hazard associated with machinery can vary over time due to motion associated with the machinery, change in temperature, pressure, radiation emitted, etc. related to the machinery, and the like; however, the claimed subject matter is not so limited. For example, even though the shape, size, and/or contour of the hazardous zones(s) can change over time, the hazardous zone recognition component 202 can determine an envelope that can include all such variations. Pursuant to a further illustration, the hazardous zone recognition component 202 can define warning and/or safety zones around each of the hazardous zones. The warning and/or safety zones, for instance, can provide minimum distances (e.g., thresholds) at which an alarm can be provided and/or operation of a machine, process, etc. can be modified.

Although depicted as being coupled to the proximity evaluation component 106, it is contemplated that the hazardous zone recognition component 202 can additionally or alternatively be coupled to the sensors 102-104 and/or the safety logic component 108. Moreover, the hazardous zone recognition component 202 can further include a teaching component 204 and/or a definition component 206. Also, it is to be appreciated that the teaching component 204 and/or the definition component 206 can be employed independently and/or in combination.

The teaching component 204 can analyze detected data provided by the sensors 102-104 and/or a disparate source while a machine, process, etc. can be operational without people, disparate objects, etc. being located within the monitored region. Thus, the teaching component 204 can evaluate characteristics associated with the environment that may be harmful. For example, the teaching component 204 can detect and/or store (e.g., by utilizing a data store (not shown)) movement associated with machinery. Pursuant to a further illustration, the teaching component 204 can identify hazardous zones by integrating detected motions associated with machinery into an envelope shape. Additionally or alternatively, temperature gradients proximate to machinery can be identified and an envelope can be defined based upon a particular temperature level. The envelope(s) identified by the teaching component 204 can be employed by the proximity evaluation component 106 to determine distance(s) from potential hazard(s).

The definition component 206 can identify hazardous zone(s) by way of evaluating detected data provided by the sensors 102-104. A shape and/or contour of the hazardous zone(s) can be interactively determined with the definition component 206 by evaluating the detected data (e.g., two-dimensional images, . . . ) yielded by the sensors 102-104. Thus, for instance, the definition component 206 can analyze the detected data obtained with the sensors 102-104 while people, disparate objects, etc. can enter, traverse, and/or exit an industrial automation environment. Accordingly, the definition component 206 can enable real-time updating of locations, shapes, contours, etc. of hazardous zones (and/or warning and safety zones) utilizing data obtained via the sensors 102-104. It is to be appreciated that the teaching component 204 can be utilized to initially identify hazardous zone(s) within an industrial automation environment and the definition component 206 can enable refining the hazardous zone(s) during monitoring. Additionally or alternatively, the definition component 206 can be employed independent of the teaching component 204, and thus, the definition component 206 can initially configure and/or update the hazardous zone(s) associated with the environment.

Figure 3:
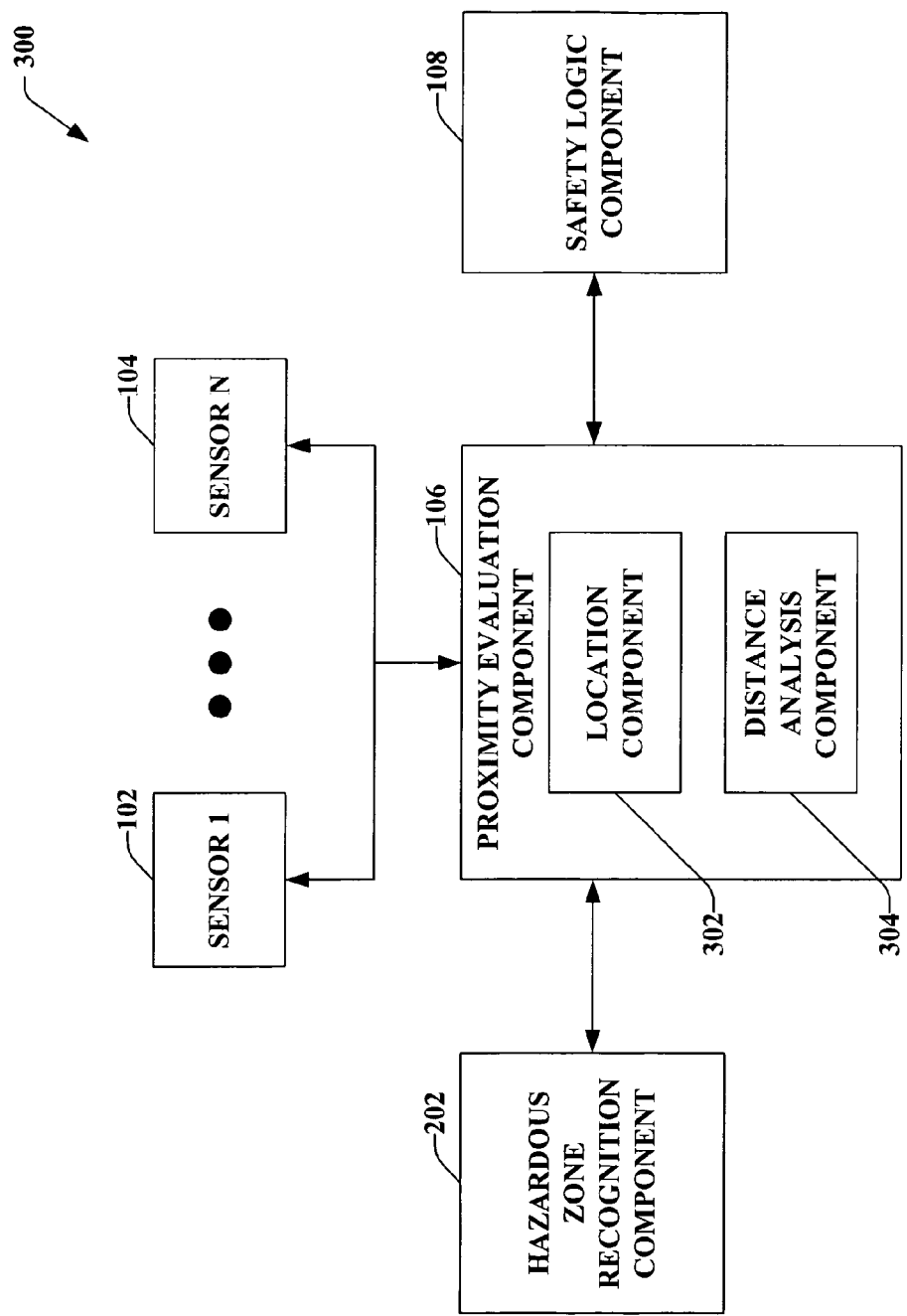
FIG. 3 illustrates a block diagram of an exemplary system that determines a location of a person and/or a disparate object and evaluates a distance from the determined location to a potential hazard within an industrial automation environment.

With reference to FIG. 3, illustrated is a system 300 that determines a location of a person and/or a disparate object and evaluates a distance from the determined location to a potential hazard within an industrial automation environment. A plurality of sensors 102-104 can monitor a number of overlapping sensing zones to yield detected data that can be provided to the proximity evaluation component 106. For example, each of the plurality of sensors 102-104 can control an entrance zone to a monitored region and identify any new shape entering into the region (e.g., a shape associated with a person, an object such as a forklift, a vehicle, a container, and the like, . . . ). The system 300 can also include the hazardous zone recognition component 202, which can identify hazardous zones within a monitored region. Further, the safety logic component 108 can utilize the determined distance to potential hazard(s) (e.g., to effectuate a change in operation, to facilitate providing an alarm, to combine distance data from a number of disparate sensors, . . . ).

Although FIG. 3 illustrates one proximity evaluation component 106 coupled to the sensors 102-104, it is contemplated that each of the sensors 102-104 can be associated with a separate, respective proximity evaluation component 106. Additionally or alternatively, the proximity evaluation component 106 can further include a location component 302 and a distance analysis component 304. The location component 302 can obtain the detected data from the sensors 102-104 and identify a position, orientation, change in position, etc. associated with a person, an object, etc. For example, the location component 302 can analyze a two-dimensional image obtained from one of the sensors 102-104 and identify any shape(s) not associated with a potential hazard as determined by the hazardous zone recognition component 202. Accordingly, a corresponding location, orientation, change in location, etc. associated with the identified shape(s) can be determined with the location component 302.

The distance analysis component 304 can utilize the location related information obtained with the location component 302 to calculate a distance between the person, object, etc. and any hazardous zone(s) as identified by the hazardous zone recognition component 202. By way of example, the distance analysis component 304 can evaluate a minimum distance between a location of a new shape and every hazardous zone as defined by the hazardous zone recognition component 202. Thereafter, the distance analysis component 304 (and/or the proximity evaluation component 106) can provide the distance related information (e.g., shortest distance to hazardous zones, warning and/or safety zones, . . . ) to the safety logic component 108. Additionally, the distance analysis component 304 (and/or the proximity evaluation component 106 and/or the safety logic component 108) can identify a closest hazardous zone to the person, object, etc. Pursuant to a further illustration, the distance analysis component 304 can determine distances to warning zone(s) and/or safety zone(s).

Figure 4:
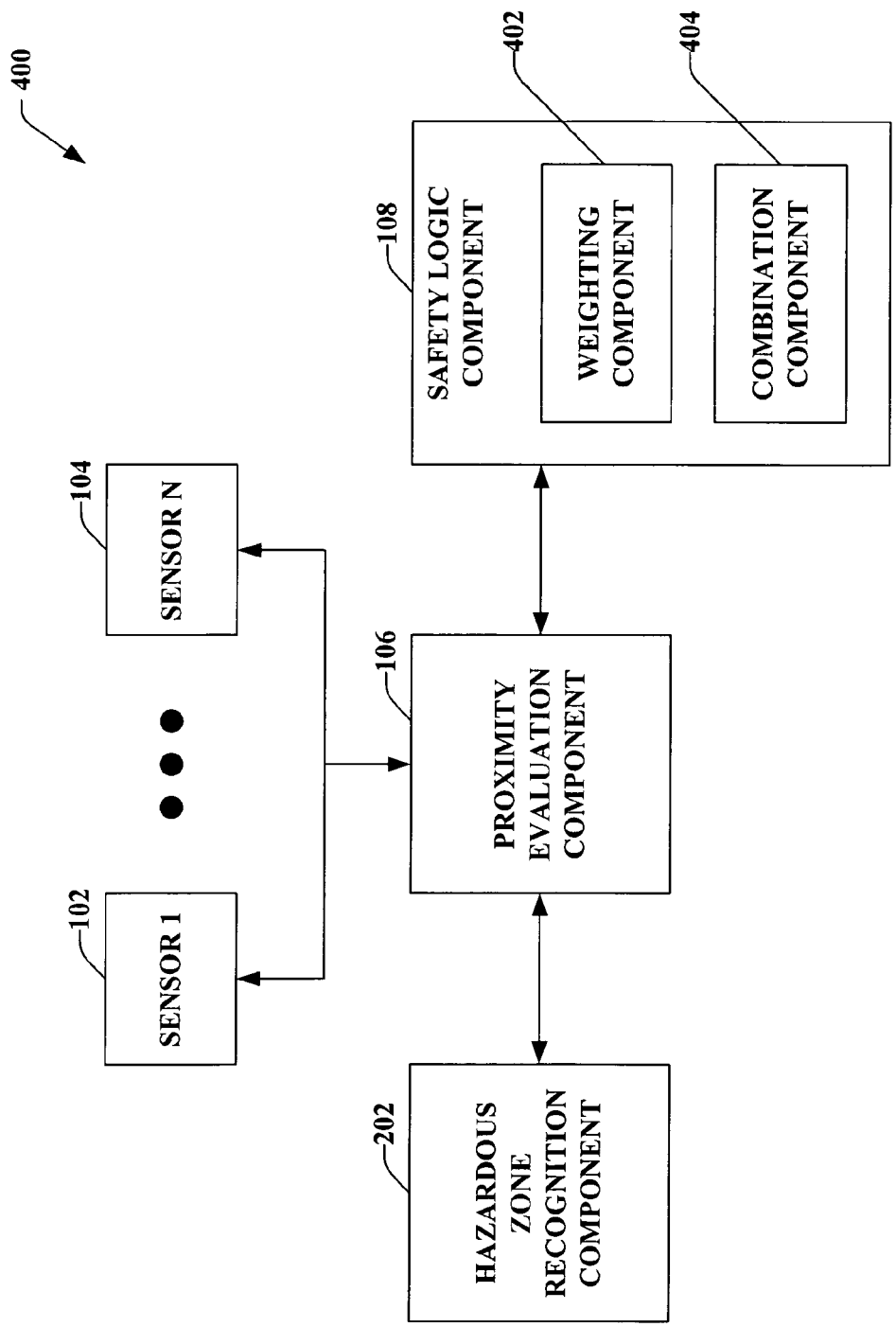
FIG. 4 illustrates a block diagram of an exemplary system that utilizes multiple, overlapping sensing zones to evaluate a proximity to potential hazards within an industrial automation environment.

Turning to FIG. 4, illustrated is a system 400 that utilizes multiple, overlapping sensing zones to evaluate a proximity to potential hazards within an industrial automation environment. The system 400 can include N sensors 102-104, where N can be any positive integer. The sensors 102-104 can utilize similar and/or disparate sensing technologies (e.g., Doppler, GPS, vision, . . . ). Detected data obtained with the sensors 102-104 can be provided to the proximity evaluation component 106. It is to be appreciated that any number of proximity evaluation components similar to the proximity evaluation component 106 can be employed in connection with the claimed subject matter. For instance, each of the sensors 102-104 can be associated with separate, respective proximity evaluation components 106; however, the claimed subject matter is not so limited. The proximity evaluation component 106 can identify distance(s) to potential hazard(s) (e.g., hazardous zone(s)), warning zone(s), safety zone(s), etc. utilizing information related to such danger(s) and/or zone(s) determined with the hazardous zone recognition component 202. By way of example, the proximity evaluation component 106 can yield distance related information from evaluations associated with the detected data from each of the sensors 102-104. Thereafter, the distance related information can be provided to the safety logic component 108, which can take into account the information associated with each of the sensors 102-104 (and/or separate proximity evaluation components corresponding to each of the sensors 102-104) to determine appropriate actions (e.g., in relation to a process, a machine, . . . ).

The safety logic component 108 can further include a weighting component 402 that can weight the distance related information based upon a likelihood of accurate measurement related to each of the sensors 102-104. A number of factors related to the sensors 102-104 can be evaluated to generate corresponding weights. By way of example, the weighting component 402 can generate a weight corresponding to sensor 1 102 based at least in part upon a number of factors related to the sensor 1 102 (and/or an environment being monitored by way of the sensors 1 102). The weight yielded with the weighting component 402 related to the sensor 1 102 can be associated with a confidence that the sensor 1 102 can provide an accurate evaluation of a signal, physical condition, etc. Further, the weighting component 402 can determine the weight prior to obtaining the distance related information (and/or the detected data from the sensors 102-104). According to an example, the weighting component 402 can adjust the distance related information based upon the appropriate weight and/or assign a weight to the distance related information. Thereafter, the combination component 404 can assemble the distance related information associated with each of the sensors 102-104 based at least in part upon the weights.

The weighting component 402 can utilize any type, number, combination, etc. of factors in association with generating weights related to the sensors 102-104. Moreover, the weighting component 402 can consider factors associated with the environment being monitored by the sensors 102-104. By way of illustration and not limitation, the weighting component 402 can utilize factors such as, for example, geographic overlap, detection resolution, probability of failure per hour (PFH), probability of failure per day (PFD), age, expected lifetime, mean time between failure (MTBF), detection technology and environment (e.g., optical, electrical, pressure, . . . ), diversity, sensing range, location of a target within sensing range, accuracy, ambient lighting, other environmental conditions, etc. Thus, according to an example, the distance between the location of the sensor (e.g., sensor 1 102, . . . ) and a target (e.g., a person, an object, . . . ) can be a factor utilized by the weighting component 402 in connection with generating a confidence associated with detected data (e.g., obtained by way of utilizing the sensor 1 102, . . . ). Thus, if the sensor 1 102 monitors two disparate targets located in a middle of an associated sensing range, the target located closer to the sensor 1 102 can be assigned a higher weight as opposed to the second target positioned at a greater distance from the sensor 1 102.

The combination component 404 can aggregate the distance related information and corresponding weighting data provided by the weighting component 402. By way of example, the combination component 404 can sum the weighted data obtained from the weighting component 402. According to a further illustration, the combination component 404 can modify the distance related information based at least in part upon the corresponding assigned weights and then aggregate the distance related information. Pursuant to a further example, the combination component 404 can utilize any type of voting configuration in connection with aggregating the distance related information. For instance, the combination component 404 can utilize a voting configuration that provides a high level of safety, a high level of availability, a combination thereof, etc.

Figure 5:
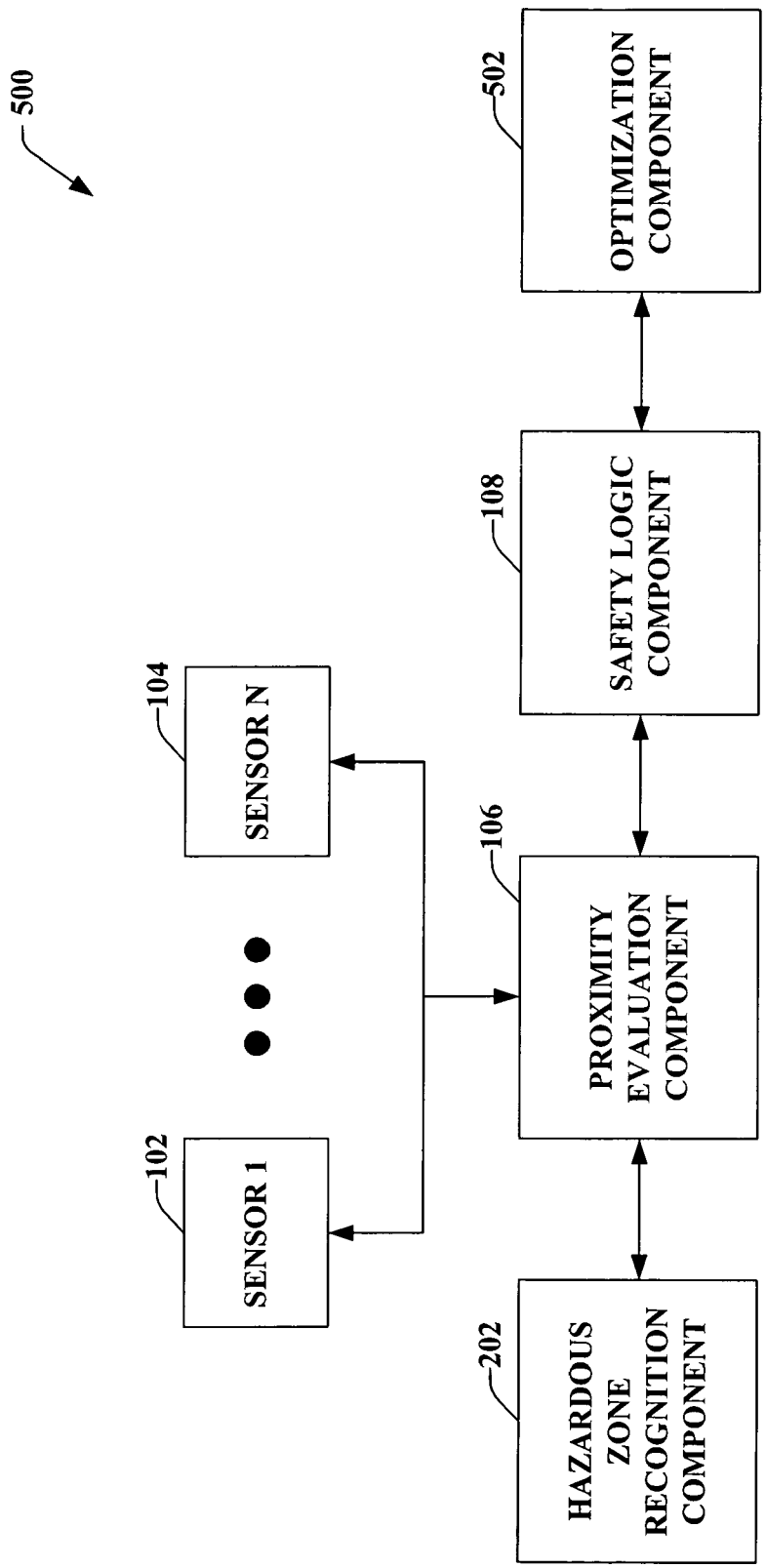
FIG. 5 illustrates a block diagram of an exemplary system that combines data obtained from a plurality of sensors, which provide an overlapping sense of a distance to a potential hazard, utilizing an optimized voting configuration within an industrial automation environment.

Turning to FIG. 5, illustrated is a system 500 that combines data obtained from a plurality of sensors 102-104, which provide an overlapping sense of a distance to a potential hazard, utilizing an optimized voting configuration within an industrial automation environment. The system 500 includes the proximity evaluation component 106 that determines a distance to a potential hazard from detected data obtained via each of the sensors 102-104. Further, the hazardous zone recognition component 202 identifies shapes, sizes, contours, etc. of potential hazardous zones within the industrial automation environment. Additionally, the safety logic component 108 can aggregate the distance related data associated with each of the sensors 102-104, and thereafter effectuate an adjustment in operation (e.g., stopping, slowing, . . . ), facilitate providing a notification and/or logging the aggregated data, etc.

Further, an optimization component 502 can generate a voting configuration that can be employed by the safety logic component 108. By way of example, the optimization component 502 can be provided with an indication of an amount of available redundancy. Additionally or alternatively, the optimization component 502 can identify an amount of available redundancy. According to an illustration, the available redundancy can be related to a machine, a process, an environment, a combination thereof, etc. The optimization component 502 can thereafter configure a voting scheme that utilizes the redundancy. The optimization component 502 can yield a voting configuration that provides for safety, availability, a combination thereof, etc. Accordingly, the optimization component 502 can determine how to allocate the available redundancy to provide for an optimized amount of safety and/or availability. The voting configuration generated by the optimization component 502 can be employed by the combination component 108 to enable combining outputs from N sensors 102-104, where N can be any positive integer.

By way of example, the optimization component 502 can determine a number of available sensors 102-104 as well as characteristics associated with the available sensors 102-104 and/or associated monitored regions. The characteristics can be related to an amount of available redundancy and/or abilities of the sensors 102-104 to accurately monitor the regions. For instance, the optimization component 502 can identify overlap in sensing ranges, location(s) of target(s) within sensing ranges, age, mean time between failures (MTBF), status, history, etc.; however, the claimed subject matter is not so limited. The optimization component 502 can utilize the obtained information to yield a voting configuration that can provide a mixture between safety and availability. The voting configuration can yield a manner in which data from a number of redundant sensors (e.g., sensors 102-104) can be combined (e.g., utilizing the safety logic component 108) and/or employed. It is to be appreciated that the optimization component 502 can generate the voting configuration at a time of setup of the system 500 and/or dynamically during runtime.

Figure 6:
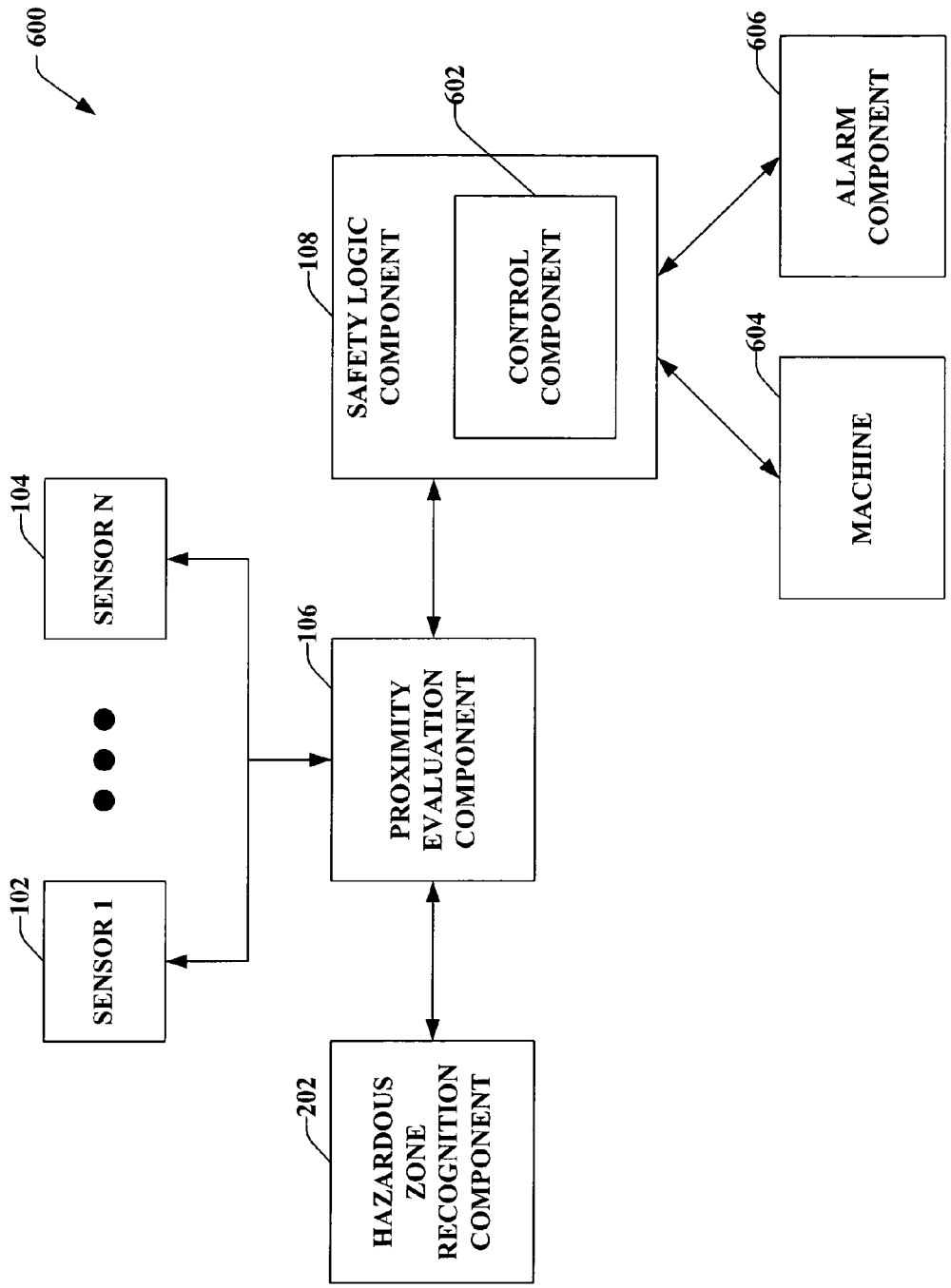
FIG. 6 illustrates a block diagram of an exemplary system that utilizes aggregated data related to distances to potential hazards from a number of redundant sensors to control operations in an industrial automation environment.

Referring now to FIG. 6, illustrated is a system 600 that utilizes aggregated data related to distances to potential hazards from a number of redundant sensors 102-104 to control operations in an industrial automation environment. The system 600 includes the proximity evaluation component 106, the safety logic component 108, and the hazardous zone recognition component 202, which can be substantially similar to respective components described above. The aggregated data can be analyzed by a control component 602 to facilitate impacting operations associated with a machine 604 and/or employing an alarm component 606. It is to be appreciated that the safety logic component 108 can include the control component 602 as depicted in FIG. 6, the control component 602 can be a stand-alone component, or a combination thereof.

The control component 602 can evaluate the aggregated data (e.g., generated utilizing the proximity evaluation component 106, the hazardous zone recognition component 202, and/or the safety logic component 108) to identify any fault, condition, property, etc. that warrants modifying operation of the machine 604. For instance, the control component 602 can analyze the aggregated data and determine that a user is located at a distance closer than a threshold from a hazardous zone. Thus, the control component 602 can cause the machine 604 to halt, slow, or otherwise modify operating parameters; however, the claimed subject matter is not so limited.

The control component 602 can also provide an indication to the alarm component 606 to provide alarms and/or warnings associated with a distance to a potential hazard. An alarm generated by the alarm component 606 can be visual and/or audible in nature. For example, the alarm component 606 can implement an alarm and/or warning such as, but not limited to, sirens, bells, warning lights, pop-up screens, blinking data display items, graphical items, email, text, cellular communication, web site activity, etc. when a particular parameter or real-time analysis is beyond a specific threshold. In an example, the alarm component 606 can sound a siren when a person or object can be positioned closer than a threshold distance from a warning zone. It is to be appreciated that the alarms generated by the alarm component 606 can be stored (e.g., in a data store (not shown)). For instance, the control component 602 can facilitate sounding an alarm via the alarm component 606 upon a first distance (e.g., within a warning zone) between a person and a hazard being identified, slow a process and/or machine (e.g., the machine 604) upon a second distance (e.g., within a safety zone) to the hazard being identified, and halt the process and/or machine (e.g., the machine 604) upon a third distance (e.g., within a hazardous zone) being determined, where the first distance can be larger than the second distance and the second distance can be greater than the third distance. It is to be appreciated that the claimed subject matter is not limited to the aforementioned example.

Figure 7:
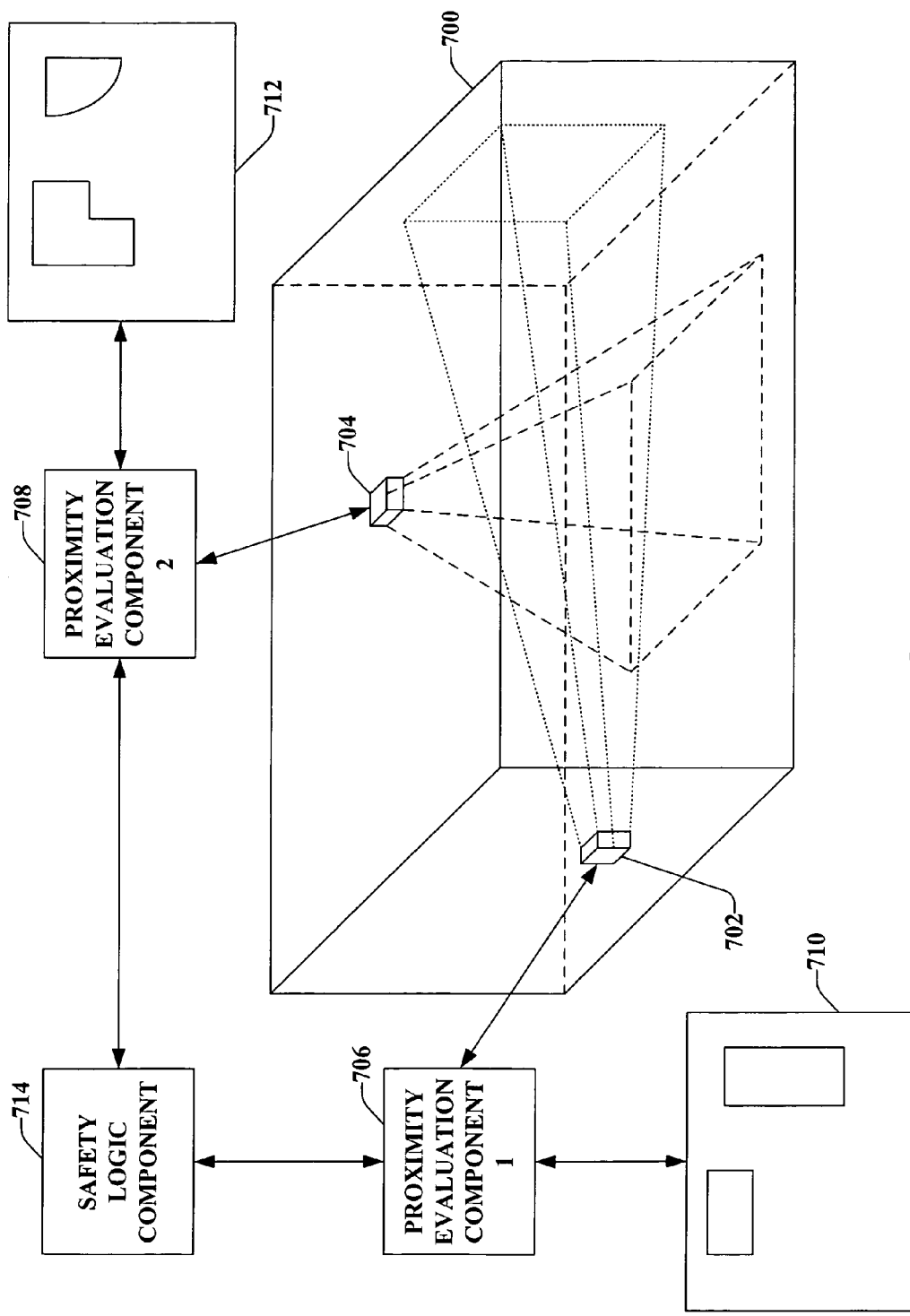
FIGS. 7-8 illustrate exemplary diagrams depicting overlapping sensing zones in an industrial automation environment.
Figure 8:
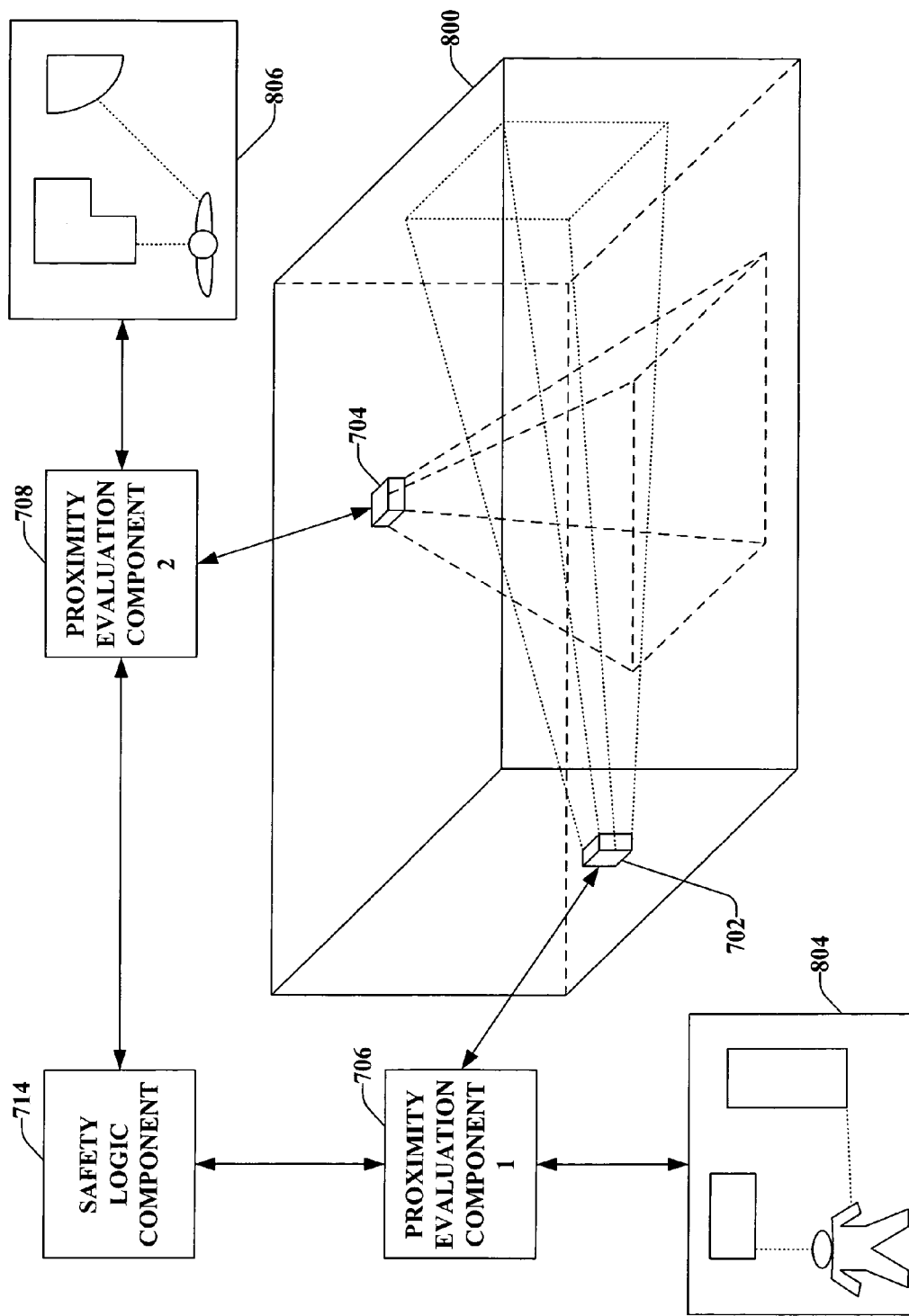

With reference to FIGS. 7-8, illustrated are exemplary diagrams depicting overlapping sensing zones in an industrial automation environment. It is to be appreciated that these illustrations are provided as examples and the claimed subject matter is not so limited. For instance, any number of sensors and any orientation of the sensors can be employed. Further, any number, size, shape, etc. of hazards can be identified and any number of people, object(s), etc. can additionally be positioned within the monitored region.

Turning to FIG. 7, illustrated is a diagram depicting a monitored region 700 in an industrial automation environment. Two sensors (e.g., a sensor 702 and a sensor 704) can detect data associated with the monitored region 700. According to an example, the monitored region 700 can include potential hazards without any people, disparate objects, etc. The sensors 702-704 can provide the detected data to a corresponding proximity evaluation component (e.g., a proximity evaluation component 1 706 associated with the sensor 1 702, a proximity evaluation component 2 708 associated with the sensor 1 704, . . . ). It is to be appreciated that the proximity evaluation components 706-708 can be substantially similar to the proximity evaluation component 106 of FIG. 1. Additionally or alternatively, although not shown, the proximity evaluation components 706-708 can include and/or be coupled to the hazardous zone recognition component 202 of FIG. 2. Each of the proximity evaluation components 706-708 can yield a two-dimensional image (e.g., an image 710 generated from detected data obtained with the sensor 1 702, an image 712 generated from detected data obtained with the sensor 2 704, . . . ) of the monitored region 700 facing the corresponding sensor 702-704. Since the images 710-712 can be obtained while including only potential hazards in the monitored region 700, the potential hazardous zones (and/or warning zones and/or safety zones) can be identified. Additionally, information related to the hazardous zones generated by each of the proximity evaluation components 706-708 can be provided to a safety logic component 714, which can be substantially similar to the safety logic component 108 described above.

Now referring to FIG. 8, illustrated is a monitored region 800 depicting an operating mode, where the sensors 702-704 can detect any new shape entering into the monitored region 800. According to this example, a person can traverse into the monitored region 800. Thus, the detected data obtained by the sensors 702-704 and provided to the proximity evaluation components 706-708 can yield images (e.g., an image 804 and an image 806) that include a person in addition to identified hazardous zones. Additionally, distances (e.g., minimum distances as shown with dotted lines in the example images 804-806) between the person and each of the hazardous zones (and/or warning zones and/or safety zones) can be determined with the proximity evaluation components 706-708, which can thereafter be provided to the safety logic component 714. Accordingly, the safety logic component 714 can effectuate a modification and/or alarm associated with a machine, process, etc. based upon an identified distance obtained from either or both of the proximity evaluation components 706-708. Thus, for instance, if one of the proximity evaluation components 706-708 includes one distance that is below a threshold value, the safety logic component 714 can modify operations and/or facilitate providing a notification. According to a further illustration, the safety logic component 714 can combine the calculations from both of the proximity evaluation components 706-708, and utilize the aggregated data to determine whether to generate a response to the distance related information. It is to be appreciated that the claimed subject matter is not limited to the aforementioned examples.

Figure 9:
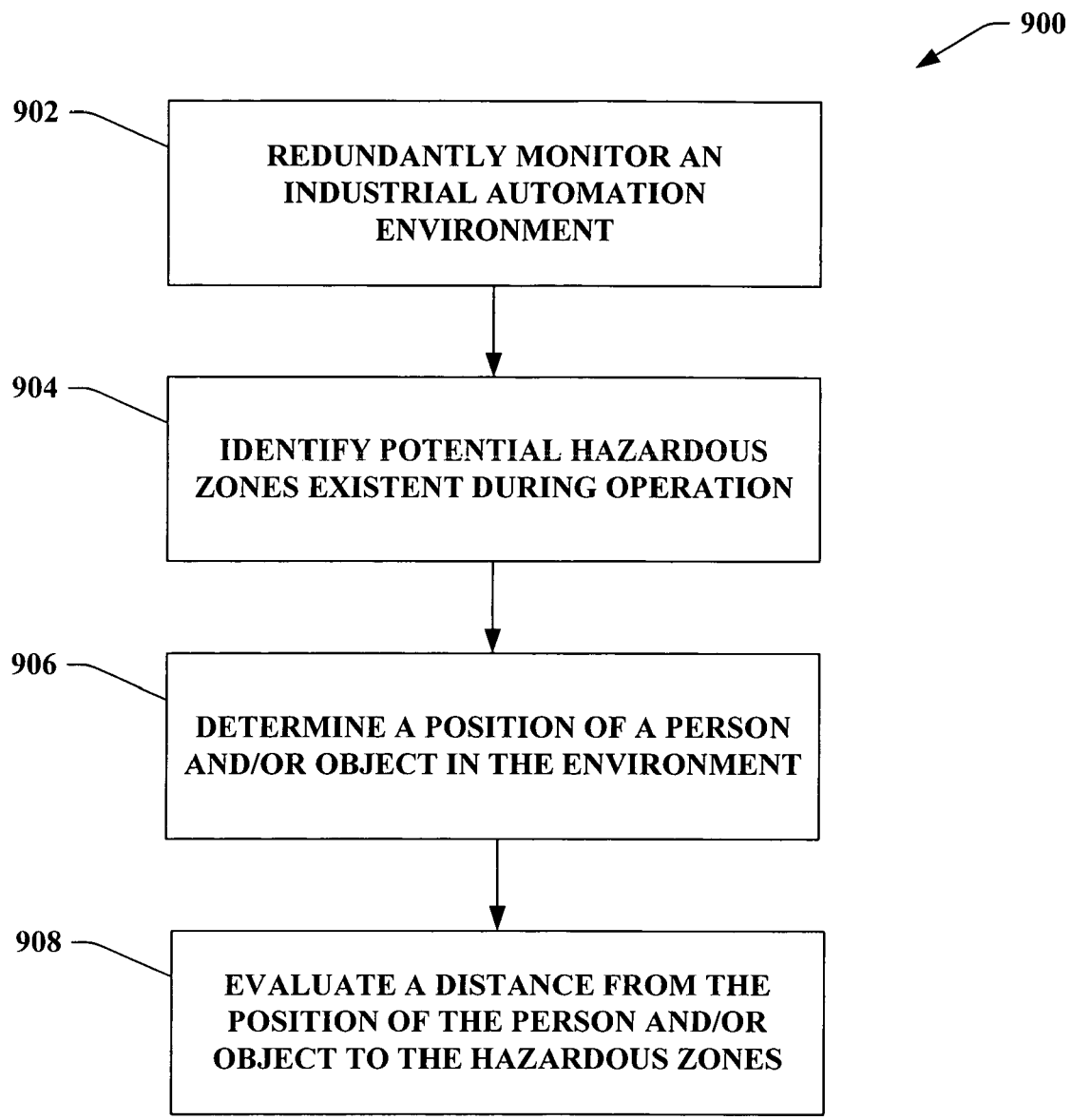
FIG. 9 is a representative flow diagram of a methodology that facilitates determining a proximity to a potential hazard in an industrial automation environment.
Figure 10:
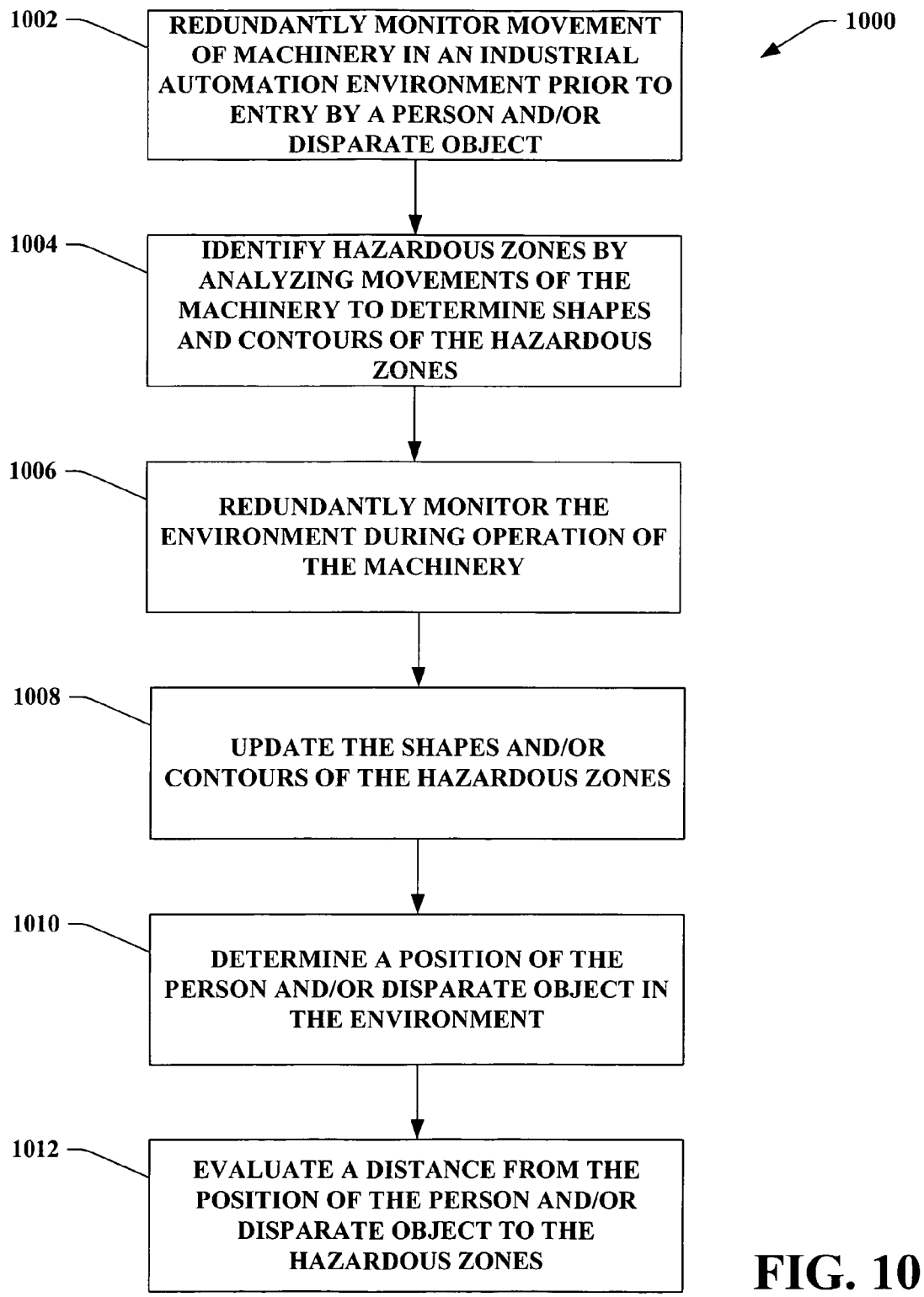
FIG. 10 is a representative flow diagram of a methodology that facilitates updating and utilizing locations of hazardous zones to enhance safety in an industrial automation environment.

Referring to FIGS. 9-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 9, illustrated is a methodology 900 that facilitates determining a proximity to a potential hazard in an industrial automation environment. At 902, the industrial automation environment can be redundantly monitored. For instance, a plurality of sensors can be employed to monitor the environment. The sensors can utilize similar and/or disparate technologies to detect a signal, physical condition, etc. Further, each sensor can be positioned at any orientation with respect to the environment and/or in comparison to the other sensors. For example, the sensors can be utilized to monitor areas in the environment in which a person can walk; however, the claimed subject matter is not so limited. At 904, potential hazardous zones that can be existent during operation (e.g., of a machine, process, . . . ) can be identified. By way of example, the potential hazardous zones can be determined prior to an entrance by a person, a disparate object, etc. into the monitored region. Additionally or alternatively, the potential hazardous zones can be identified utilizing detected data obtained while monitoring the industrial automation environment (e.g., during runtime, with people and/or disparate objects entering, traversing, and/or exiting the environment, . . . ). Accordingly, the potential hazardous zones can be updated in real time utilizing the detected data, for example. Any number of potential hazardous zones can be identified, and each of the potential hazardous zones can be associated with any size, shape, contour, etc. Moreover, the potential hazardous zones can be related to any machinery, process, and the like that can present a potential danger. Pursuant to a further illustration, warning zones and/or safety zones can be defined around the hazardous zones.

At 906, a position of a person and/or object within the environment can be determined. The person and/or object can remain at a same location within, enter into, leave from, traverse from one location to another location within, etc. the monitored region. For example, two-dimensional images associated with the sections of the monitored region facing each of the sensors can be obtained and/or recorded. Pursuant to this example, any shape other than the potential hazardous zone(s) can be located. At 908, a distance from the position of the person and/or object to the hazardous zones can be determined. For example, a minimum distance from the identified location of the person, object, etc. to the hazardous zones can be calculated. Additionally or alternatively, distances from the position of the person, object, etc. to warning zones and/or safety zones can be evaluated. The distance related information can be identified individually for the detected data corresponding to each of the sensors, for instance. Thereafter, the distance related information can be aggregated (e.g., with or without weights corresponding to the sensors). Additionally or alternatively, the distance related information associated with each of the sensors can be evaluated separately. The distance related information associated with the redundant sensors, whether combined or separate, can be employed to effectuate a modification to a machine, process, etc. For example, if a minimum distance to a hazardous zone (e.g., employing the detected data obtained with one of the sensors, utilizing aggregated distance data, . . . ) is less than a threshold value, a machine can be shutdown; however, the claimed subject matter is not so limited. Moreover, such information can be employed to facilitate providing an alarm.

Now referring to FIG. 10, illustrated is a methodology 1000 that facilitates updating and utilizing locations of hazardous zones to enhance safety in an industrial automation environment. At 1002, movement of machinery in an industrial automation environment can be redundantly monitored prior to entry by a person and/or a disparate object. It is to be appreciated that any number, type, location, orientation, etc. of sensors can be employed. Additionally, the monitoring can be continuous, intermittent, etc. At 1004, hazardous zones can be identified by analyzing the movements of the machinery to determine shapes and/or contours of the hazardous zones. For example, an envelope can be defined based upon an integration of the movements of the machinery. At 1006, the environment can be redundantly monitored during operation of the machinery. Accordingly, a person, a disparate object, etc. can enter, traverse, exit, etc. the industrial automation environment (e.g., the monitored region) during operation of the machinery and data related to such events and/or detected data associated with potential hazards can be obtained (e.g., by employing a number of sensors, . . . ). At 1008, the shapes and/or contours of the hazardous zones can be updated. For example, the updating can be based upon detected data obtained while redundantly monitoring the environment with any people, objects, etc. entering, traversing, exiting, etc. At 1010, a position of a person and/or a disparate object can be determined in the environment. The position related data can be determined continuously, intermittently (e.g., at fixed and/or varying intervals, . . . ), etc. At 1012, a distance from the position of the person and/or the disparate object to the updated hazardous zones can be evaluated. By way of illustration, a minimum distance can be determined. Additionally or alternatively, a closest hazardous zone can be identified. Further, distances to warning zones and/or safety zones can also be determined. The distance related information can be employed to modify operations (e.g., yield a shutdown, slowdown, pause, speedup, restart, etc. associated with operations, . . . ) and/or provide an alarm.

Figure 11:
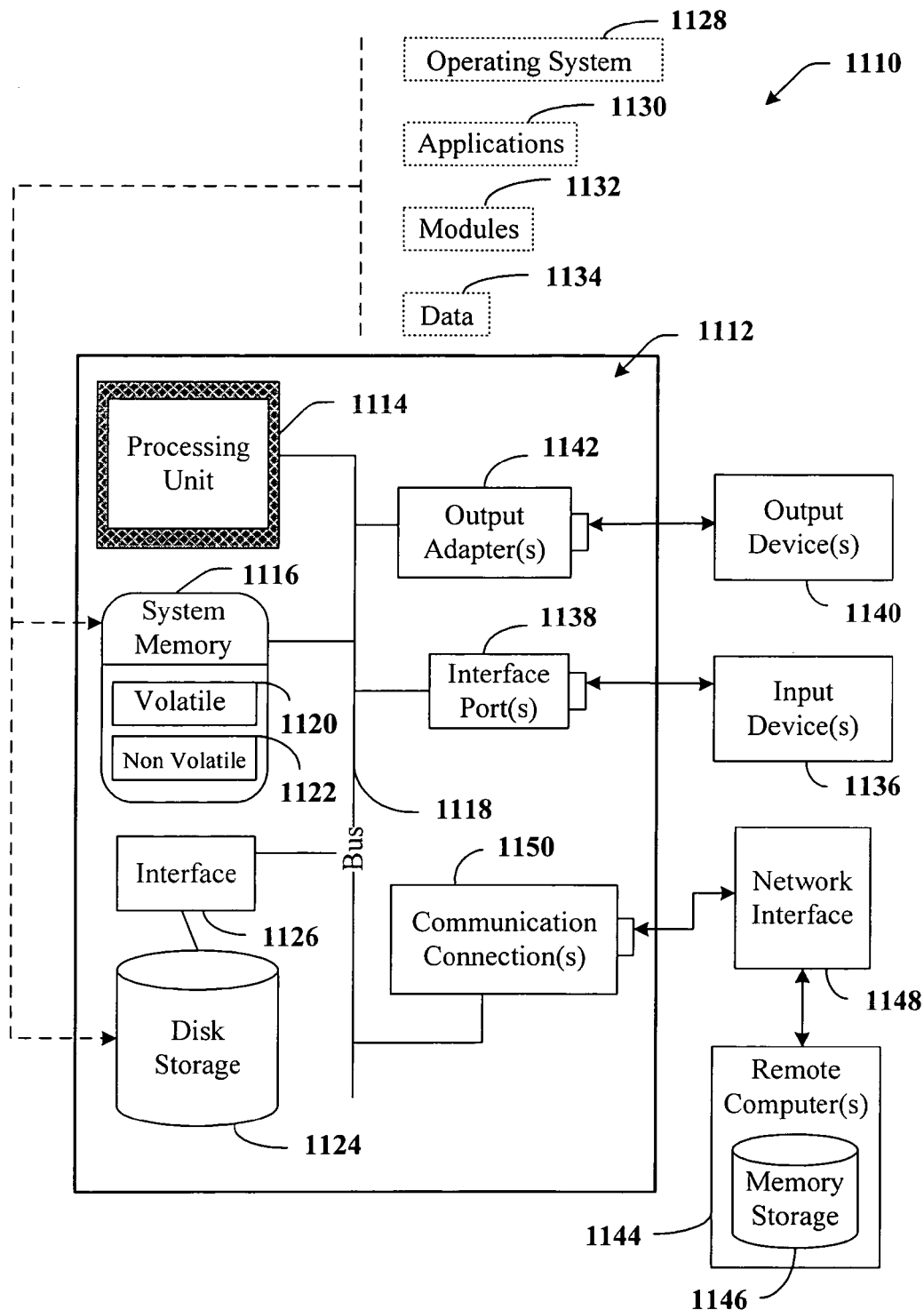
FIG. 11 is an example operating system upon which various features described herein can be implemented.

With reference to FIG. 11, an exemplary environment 1110 for implementing various aspects includes a computer 1112. The computer 1112 can be a safety computer such as, for instance, a safety personal computer, a safety programmable logic controller (PLC), or the like. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject innovation can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
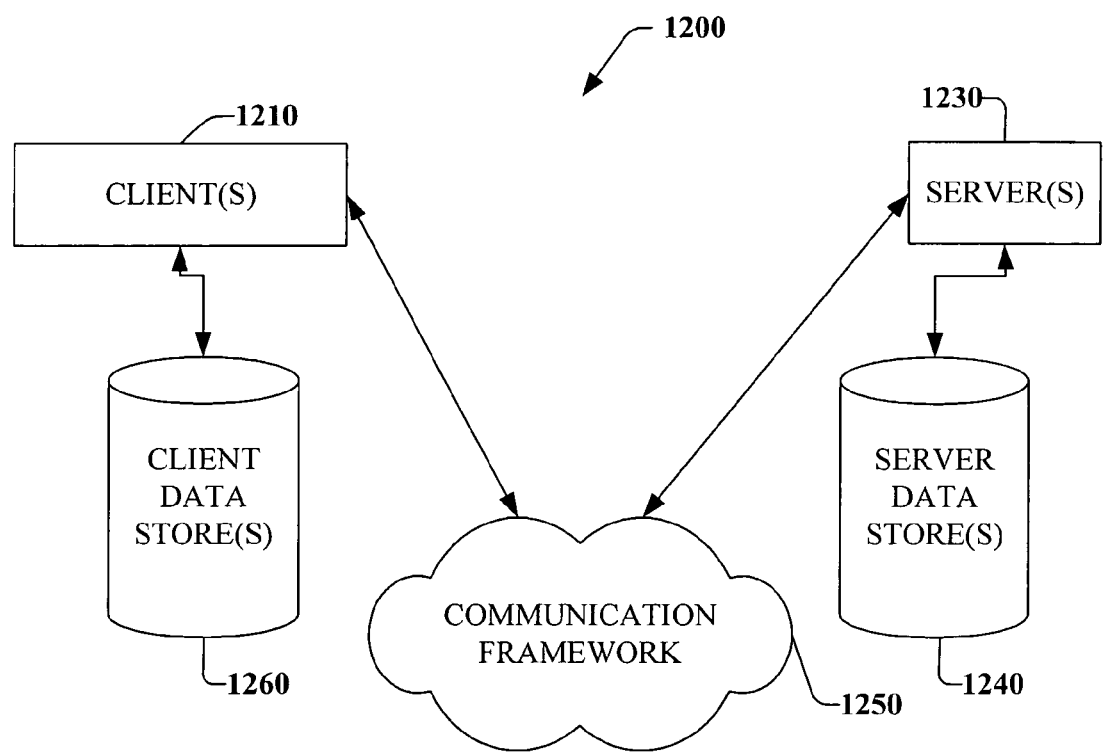
FIG. 12 is an exemplary computing environment within which various features described herein can interact.

FIG. 12 is a schematic block diagram of a sample-computing environment 1200 with which the claimed subject matter can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject innovation, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system that evaluates proximity to potential hazards, comprising:
   a plurality of sensors that provide redundant detected data;
   a proximity evaluation component that evaluates the detected data, determines a location of at least one of a person and an object, and identifies a distance from the location to one or more hazardous zones in a monitored region; and
   a safety logic component that utilizes the distance from the location to the one or more hazardous zones to yield a corresponding response, the safety logic component at least comprises a weighting component that weights distance related information based upon a likelihood of accurate measurement related to each of the plurality of sensors.

2. The system of claim 1, the plurality of sensors provide redundancy by utilizing overlapping sensing ranges.

3. The system of claim 1, the plurality of sensors includes one or more of thermal energy sensors, electromagnetic sensors, mechanical sensors, chemical sensors, optical sensors, radiation sensors, acoustic sensors, and biological sensors.

4. The system of claim 1, the plurality of sensors continuously monitor the monitored region.

5. The system of claim 1, the plurality of sensors intermittently evaluate the monitored region utilizing at least one of a predetermined time interval and a varying time interval.

6. The system of claim 1, the plurality of sensors monitor the monitored region upon an occurrence of an event.

7. The system of claim 1, the plurality of sensors each obtain a two-dimensional image associated with a corresponding section of the monitored region facing a respective one of the plurality of sensors.

8. The system of claim 1, the plurality of sensors each being associated with a separate, respective proximity evaluation component.

9. The system of claim 1, the proximity evaluation component continuously evaluates the location and the distance to the one or more hazardous zones.

10. The system of claim 1, the proximity evaluation component individually analyzes the detected data provided from each of the plurality of sensors.

11. The system of claim 1, the proximity evaluation component determines whether the distance from the location to any of the hazardous zones is below a threshold.

12. The system of claim 1, further comprising a location component that obtains the detected data and identifies at least one of a position, an orientation, and a change in location associated with the at least one of the person and the object.

13. The system of claim 12, the location component analyzes a two-dimensional image obtained from one of the plurality of sensors and identifies disparate shapes other than shapes associated with potential hazards.

14. The system of claim 1, further comprising a distance analysis component that evaluates a minimum distance between the location and the one or more hazardous zones.

15. The system of claim 1, further comprising a hazardous zone recognition component that identifies the one or more hazardous zones within the monitored region.

16. The system of claim 15, the hazardous zone recognition component identifies hazardous zones associated with at least one of a movement of machinery, a temperature, a pressure, and an amount of emitted radiation.

17. The system of claim 15, the hazardous zone recognition component further comprises a teaching component that evaluates potentially harmful characteristics associated with the monitored region prior to entry into the monitored region by the at least one of the person and the object.

18. The system of claim 17, the teaching component identifies the one or more hazardous zones by integrating detected motions associated with machinery into an envelope shape for each of the one or more hazardous zones.

19. The system of claim 15, the hazardous zone recognition component further comprises a definition component that dynamically updates at least one of a shape and a contour of the one or more hazardous zones during operation by accounting for account for both constant and changing conditions in the monitored region.

20. The system of claim 1, the safety logic component modifies operation based at least in part upon the distance.

21. The system of claim 1, the modification being at least one of halting, slowing, speeding up, and restarting operation.

22. The system of claim 1, the safety logic component combines distance related information associated with the plurality of sensors.

23. The system of claim 1, the safety logic component further comprises a combination component that aggregates distance related information associated with the plurality of sensors.

24. The system of claim 1, further comprising an optimization component that generates a voting configuration that the safety logic component employs to generate the corresponding response based upon distance related information from the plurality of sensors.

25. The system of claim 1, further comprising a control component that causes a machine to modify operating parameters based at least in part upon the distance.

26. The system of claim 1, further comprising an alarm component that provides an alarm based at least in part upon the distance.

27. A method that facilitates determining a proximity to a potential hazard in an industrial automation environment, comprising:
   redundantly monitoring an industrial automation environment by a plurality of sensors;
   identifying one or more hazardous zones existent during operation in the environment;
   determining a position of at least one of a person and an object in the environment;

evaluating a distance from the position of the at least one of the person and the object to the one or more hazardous zones; and utilizing the distance from the at least one of the person and the object to the one or more hazardous zones to yield a corresponding response, wherein distance related information is weighed based upon a likelihood of accurate measurement related to each of the plurality of sensors.

28. The method of claim 27, further comprising obtaining a redundant sense of the environment by utilizing a plurality of sensors.

29. The method of claim 27, further comprising monitoring areas in the environment in which the at least one of the person and the object one or more of enters, exits, and traverses.

30. The method of claim 27, further comprising continuously monitoring the environment, continuously identifying the one or more hazardous zones, continuously determining the position, and continuously evaluating the distance.

31. The method of claim 27, further comprising:

monitoring movement of machinery in the environment prior to entry by the at least one of the person and the object; and identifying the one or more hazardous zones by analyzing the movement of the machinery to determine corresponding shapes and contours of the one or more hazardous zones.

32. The method of claim 27, further comprising dynamically updating at least one of a contour and a shape associated with at least one of the one or more identified hazardous zones during runtime by accounting for account for both constant and changing conditions in the monitored region.

33. The method of claim 27, further comprising:

obtaining a two-dimensional image associated with a section of the environment facing each of a plurality of sensors;

locating a shape other than the one or more hazardous zones; and determining a distance from the location of the shape to the one or more hazardous zones.

34. The method of claim 27, further comprising identifying a minimum distance from the position to the one or more hazardous zones.

35. The method of claim 27, further comprising separately evaluating detected data from a plurality of sensors to determine distance related information corresponding to each of the plurality of sensors.

36. The method of claim 27, wherein the response includes at least one of modifying operation and providing an alarm based upon the determined distance being below a threshold value.

37. A system that determines a proximity to a potential hazard in an industrial automation environment, comprising:

means for redundantly monitoring a region, wherein the means for redundantly monitoring includes a plurality of sensors;

means for identifying a hazardous zone in the region;

means for determining a location of at least one of a person and an object in the region;

means for evaluating a distance from the location of the at least one of the person and the object to the hazardous zone; and means for utilizing the distance from the at least one of the person and the object to the one or more hazardous zones to yield a corresponding response based at least in part upon the distance, wherein distance related information is weighed based upon a likelihood of accurate measurement related to each of the plurality of sensors.

38. The system of claim 37, wherein:

the means for determining a location of at least one of a person and an object in the region determines the location in realtime; and the means to yield a corresponding response based at least in part upon the distance provides a response which prevents the at least one of a person and an object from entering the hazardous zone.

* * * * *